United States Patent
Kondo et al.

(10) Patent No.: US 10,866,180 B2
(45) Date of Patent: Dec. 15, 2020

(54) PARTICLE DIAMETER ACQUISITION DEVICE, PARTICLE DIAMETER ACQUISITION SYSTEM, AND PARTICLE DIAMETER ACQUISITION METHOD

(71) Applicant: MITSUBISHI HEAVY INDUSTRIES, LTD., Tokyo (JP)

(72) Inventors: Yoshiyuki Kondo, Tokyo (JP); Yoshiteru Komuro, Tokyo (JP); Atsushi Kodama, Tokyo (JP); Koichi Tanimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/787,697

(22) Filed: Feb. 11, 2020

(65) Prior Publication Data

US 2020/0326270 A1 Oct. 15, 2020

(30) Foreign Application Priority Data

Apr. 15, 2019 (JP) ................................. 2019-077196

(51) Int. Cl.
  *G01N 21/00* (2006.01)
  *G01N 15/02* (2006.01)
  *G01N 15/06* (2006.01)

(52) U.S. Cl.
  CPC ..... *G01N 15/0227* (2013.01); *G01N 15/0211* (2013.01); *G01N 15/06* (2013.01)

(58) Field of Classification Search
  CPC .............. G01N 15/02; G01N 15/0205; G01N 15/1459; G01N 15/10; G01N 15/06; G01N 21/53; G01N 21/05; G01N 2015/1486; G01N 2015/1493; G01N 2015/0294; G01N 2015/0046; G01N 2015/025;

(Continued)

(56) References Cited

U.S. PATENT DOCUMENTS 5,684,587 A * 11/1997 Naqwi ............... G01N 15/0205
                                                   356/336
2008/0261827 A1 10/2008 Iwakura et al.
2019/0192056 A1* 6/2019 Iinaga .................. A61B 5/4866

FOREIGN PATENT DOCUMENTS

JP          4528951       8/2010
JP          2014-220289   11/2014

* cited by examiner

*Primary Examiner* — Hoa Q Pham
(74) *Attorney, Agent, or Firm* — Wenderoth, Lind & Ponack, L.L.P.

(57) ABSTRACT

A particle diameter acquisition device includes an intensity distribution acquisition unit configured to acquire an intensity distribution of scattered light scattered from a multi-phase flow including dispersed phase at the time of irradiating the multi-phase flow with irradiation light, an attenuation gradient acquisition unit configured to acquire an attenuation gradient in the intensity distribution on the basis of the intensity distribution of the scattered light, a concentration acquisition unit configured to acquire a concentration of the dispersed phase in the multi-phase flow, a database configured to store intensity distribution data which is an intensity distribution of scattered light for each particle diameter and concentration of a dispersed phase, and a particle diameter acquisition unit configured to acquire a particle diameter of the dispersed phase on the basis of the acquired attenuation gradient, concentration, and intensity distribution data with reference to the intensity distribution data.

10 Claims, 7 Drawing Sheets

(58) Field of Classification Search
CPC ... G01N 2015/1463; G01N 2015/1497; G01N 2015/1404; G01N 2015/1087; G01N 2015/1093; G01N 2021/4707
USPC .......................... 356/335–343, 73, 432–440
See application file for complete search history.

PARTICLE DIAMETER ACQUISITION DEVICE, PARTICLE DIAMETER ACQUISITION SYSTEM, AND PARTICLE DIAMETER ACQUISITION METHOD

BACKGROUND OF THE INVENTION

Field of the Invention

The present invention relates to a particle diameter acquisition device, a particle diameter acquisition system, and a particle diameter acquisition method.

The application is based on Japanese Patent Application No. 2019-77196 filed on Apr. 15, 2019, the content of which is incorporated herein by reference.

Description of Related Art

In the past, the diameters (droplet diameters) of droplets sprayed from a multi-phase flow have been measured through visualization using a high-speed camera or the like. Patent Document 1 discloses a technique for obtaining light of a desired color using light wavelength conversion glass.

PATENT DOCUMENTS

Patent Document 1: Japanese Unexamined Patent Application, First Publication No. 2014-220289

SUMMARY OF THE INVENTION

However, in a case where droplets to be measured are contained at a high concentration, it is known that it is difficult to measure droplet diameters through visualization. Although there is also a droplet diameter measurement technique using a laser, only visible light can be used, and it is difficult to measure a droplet diameter by causing visible light to transmit a medium that easily absorbs visible light. There are similar problems for particles other than droplets (powders and the like).

The present invention is contrived in view of the above-described circumstances, and an object thereof is to provide a particle diameter acquisition device, a particle diameter acquisition system, and a particle diameter acquisition method for acquiring a particle diameter of a dispersed phase, included in a multi-phase flow at a high concentration, with a high level of accuracy.

In order to solve the above-described problems, the present invention adopts the following means.

That is, according to an aspect of the present invention, a particle diameter acquisition device includes an intensity distribution acquisition unit which is configured to acquire an intensity distribution of scattered light scattered from a multi-phase flow including a dispersed phase at a time of irradiating the multi-phase flow with irradiation light, an attenuation gradient acquisition unit which is configured to acquire an attenuation gradient in the intensity distribution on the basis of the intensity distribution of the scattered light, a concentration acquisition unit which is configured to acquire a concentration of the dispersed phase in the multi-phase flow, a database which is configured to store intensity distribution data which is an intensity distribution of scattered light for each particle diameter and concentration of a dispersed phase, and a particle diameter acquisition unit which is configured to acquire a particle diameter of the dispersed phase on the basis of the acquired attenuation gradient, concentration, and intensity distribution data with reference to the intensity distribution data.

According to another aspect of the present invention, a particle diameter acquisition method includes an intensity distribution acquisition step of acquiring an intensity distribution of scattered light scattered from a multi-phase flow including a dispersed phase at the time of irradiating the multi-phase flow with irradiation light; an attenuation gradient acquisition step of acquiring an attenuation gradient in the intensity distribution on the basis of the intensity distribution of the scattered light; a concentration acquisition step of acquiring a concentration of the dispersed phase in the multi-phase flow; and a particle diameter acquisition step of acquiring a particle diameter of the dispersed phase on the basis of the acquired attenuation gradient, concentration, and intensity distribution data with reference to a database which is configured to store intensity distribution data which is an intensity distribution of scattered light for each particle diameter and concentration of a dispersed phase.

According to still another aspect of the present invention, a particle diameter acquisition device includes a first intensity distribution acquisition unit which is configured to acquire a first intensity distribution of scattered light scattered from a multi-phase flow including a dispersed phase at the time of irradiating the multi-phase flow with first irradiation light, a first attenuation gradient acquisition unit which is configured to acquire an attenuation gradient of the first intensity distribution, a second intensity distribution acquisition unit which is configured to acquire an intensity distribution of scattered light scattered from the multi-phase flow at the time of irradiating the multi-phase flow with first irradiation light having a wavelength different from that of the first irradiation light, a second attenuation gradient acquisition unit which is configured to acquire an attenuation gradient of the second intensity distribution, a first database which is configured to store first correlation data which is a correlation between a particle diameter for each concentration of the dispersed phase at the time of irradiating the multi-phase flow with the first irradiation light and an attenuation gradient of an intensity distribution of scattered light, a second database which is configured to store second correlation data which is a correlation between a particle diameter for each concentration of the dispersed phase at the time of irradiating the multi-phase flow with the first irradiation light and an attenuation gradient of an intensity distribution of scattered light, and a particle diameter acquisition unit which is configured to acquire a particle diameter of the dispersed phase on the basis of the attenuation gradient of the first intensity distribution and the attenuation gradient of the second intensity distribution with reference to the first correlation data and the second correlation data.

According to still another aspect of the present invention, a particle diameter acquisition method includes a first intensity distribution acquisition step of acquiring a first intensity distribution of scattered light scattered from a multi-phase flow including a dispersed phase at the time of irradiating the multi-phase flow with first irradiation light, a first attenuation gradient acquisition step of acquiring an attenuation gradient of the first intensity distribution, a second intensity distribution acquisition step of acquiring an intensity distribution of scattered light scattered from the multi-phase flow at the time of irradiating the multi-phase flow with first irradiation light having a wavelength different from that of the first irradiation light, a second attenuation gradient acquisition step of acquiring an attenuation gradient of the second intensity distribution, and a particle diameter acquisition step of acquiring a particle diameter of the dispersed phase on the basis of the attenuation gradient of the first intensity distribution and the attenuation gradient of the second intensity distribution with reference to a first database which is configured to store first correlation data which is a correlation between a particle diameter for each concentration of the dispersed phase at the time of irradiating the multi-phase flow with the first irradiation light and an attenuation gradient of an intensity distribution of scattered light, and a second database which is configured to store second correlation data which is a correlation between a particle diameter for each concentration of the dispersed phase at the time of irradiating the multi-phase flow with the first irradiation light and an attenuation gradient of an intensity distribution of scattered light.

The dispersed phase may be droplets.

The irradiation light may be invisible light.

According to still another aspect of the present invention, a particle diameter acquisition system includes the above-described particle diameter acquisition device, a nozzle which is configured to spray a multi-phase flow, a light source which is configured to irradiate the multi-phase flow with irradiation light, and a detection unit which is configured to detect scattered light scattered from the multi-phase flow.

According to a measurement method of the present invention, it is possible to measure a particle diameter of a dispersed phase with a high level of accuracy by utilizing a database regardless of whether or not scattered light is visible light.

DETAILED DESCRIPTION OF THE INVENTION

Figure 1:
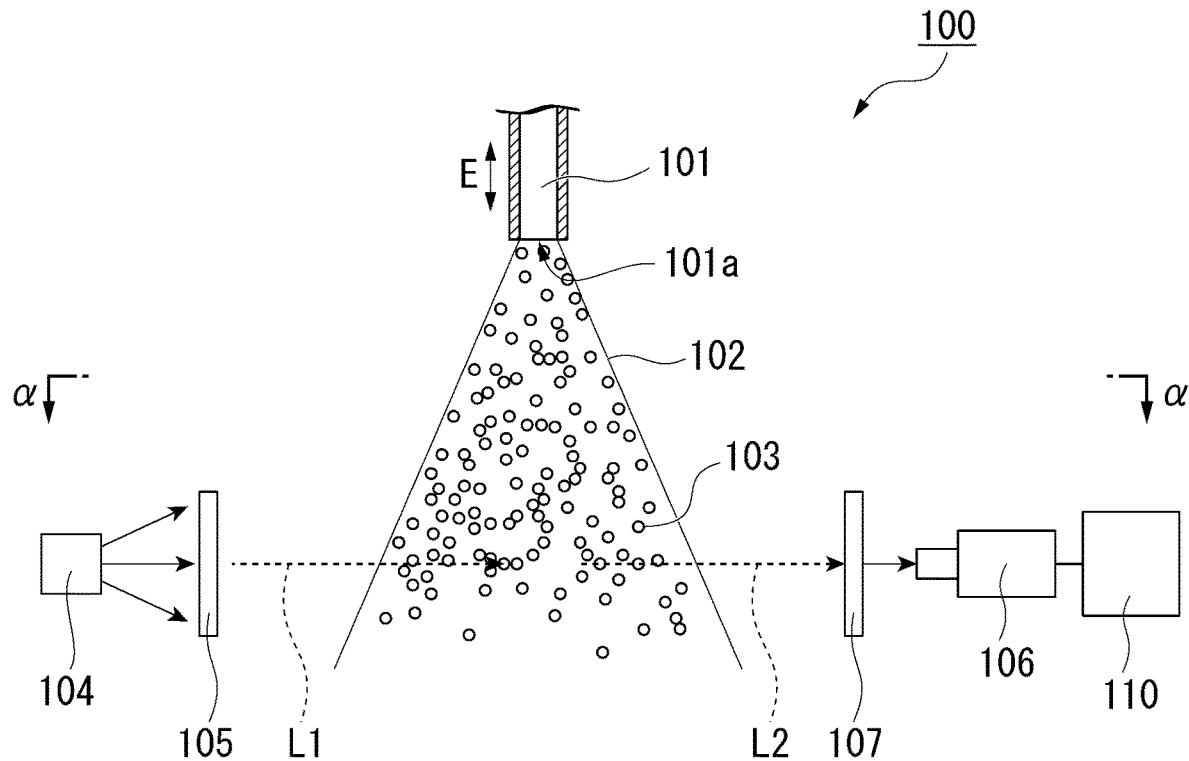
FIG. 1 is a schematic diagram showing an outline of a particle diameter acquisition system according to a first embodiment of the present invention.

Hereinafter, a particle diameter acquisition device, an acquisition system, and a particle diameter acquisition method according to embodiments to which the present invention is applied will be described in detail with reference to the accompanying drawings. Meanwhile, in the drawings used in the following description, characteristic portions may be conveniently illustrated at an enlarged scale for easy understanding of the characteristics, and particle diameter ratios and the like of the respective components are not necessarily the same as the actual ones. Further, materials, particle diameters, and the like exemplified in the following description are merely exemplary, do not limit the present invention, and can be appropriately modified within a range in which the gist is not changed.

First Embodiment

FIG. 1 is a schematic diagram showing an outline of a particle diameter acquisition system according to a first embodiment of the present invention. A particle diameter acquisition system 100 of the present embodiment includes a nozzle 101, a light source 104, a first medium 105, a camera 106 serving as a detection unit, a second medium 107, and a particle diameter acquisition device 110.

The nozzle 101 sprays a multi-phase flow 102 including dispersed phases 103. The multi-phase flow 102 is, for example, a vapor jet flow, and the dispersed phase 103 in this case is water droplets. In the particle diameter acquisition system 100 of the present embodiment, a particle diameter of the dispersed phase 103 is acquired. Meanwhile, the dispersed phase 103 is not limited to a liquid (droplets) and may be either of a solid (powder) or a gas. The dispersed phase 103 is included in the multi-phase flow 102 at a predetermined concentration.

The light source 104 emits irradiation light L1 (laser beam) to the multi-phase flow 102 discharged from an opening 101a of the nozzle 101. It is preferable to use light such as ultraviolet rays or infrared rays (invisible light) as the irradiation light L. An irradiation direction of the irradiation light L1 is a direction intersecting an extension direction E of the nozzle 101 in the vicinity of the opening 101a of the nozzle 101 and is preferably a direction which is substantially perpendicular to the extension direction.

The first medium 105 is disposed between the light source 104 and the multi-phase flow 102. The first medium 105 is, for example, a plate glass. The irradiation light L1 from the light source 104 penetrates a plate glass and then passes through the dispersed phase 103.

Meanwhile, in a case where the light source 104 emitting visible light is used, a predetermined wavelength conversion medium may be used as the first medium 105. Thereby, visible light from the light source 104 can be converted into invisible light through a wavelength conversion medium.

The camera 106 is installed on a side substantially opposite to the light source 104 with the dispersed phase 103 interposed therebetween. The camera 106 detects scattered light L2 which is scattered from the multi-phase flow 102 in accordance with the irradiation with the irradiation light L1. That is, the camera 106 captures an image of the scattered light L2.

Figure 2:
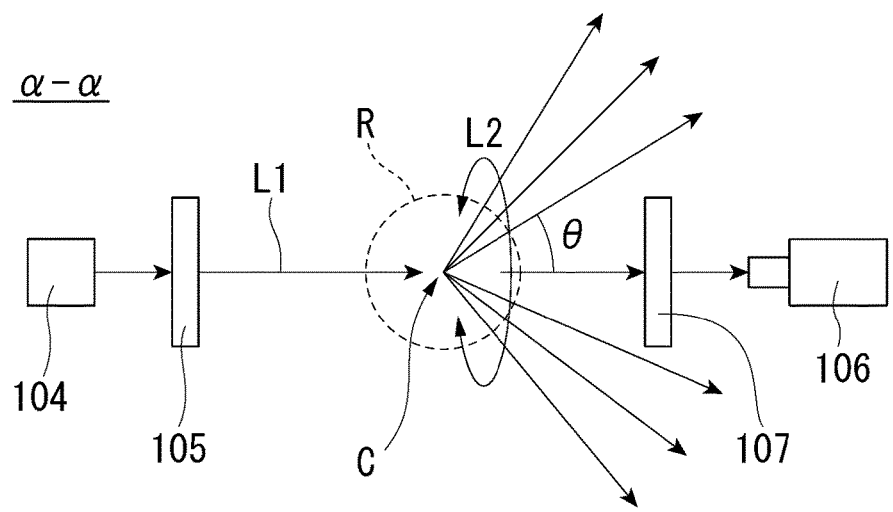
FIG. 2 is a plan view of a portion of the particle diameter acquisition system of FIG. 1.

FIG. 2 is a diagram showing a portion of the particle diameter acquisition system on a surface passing through a line α-α of FIG. 1 when seen in a plan view and shows a state where irradiation light L1 and scattered light L2 are distributed. When the irradiation light L1 emitted in a predetermined direction reaches a region R in which the dispersed phase 103 is distributed, the energy, momentum, angular momentum, and the like of the irradiation light are convened through an interaction with the dispersed phase 103, and the scattered light L2 is scattered in directions of various angles with respect to an irradiation direction.

The camera 106 is rotationally moved centering on a position where the dispersed phase 103 is distributed and captures an image of the scattered light L2 for each rotation angle θ.

The second medium is disposed between the multi-phase flow 102 and the camera 106. In a case where the camera 106 cannot detect invisible light, a wavelength conversion medium 107 is used as a second medium. Thereby, light reaching the camera is converted into visible light, and the scattered light L2 can be detected by the camera.

Figure 3:
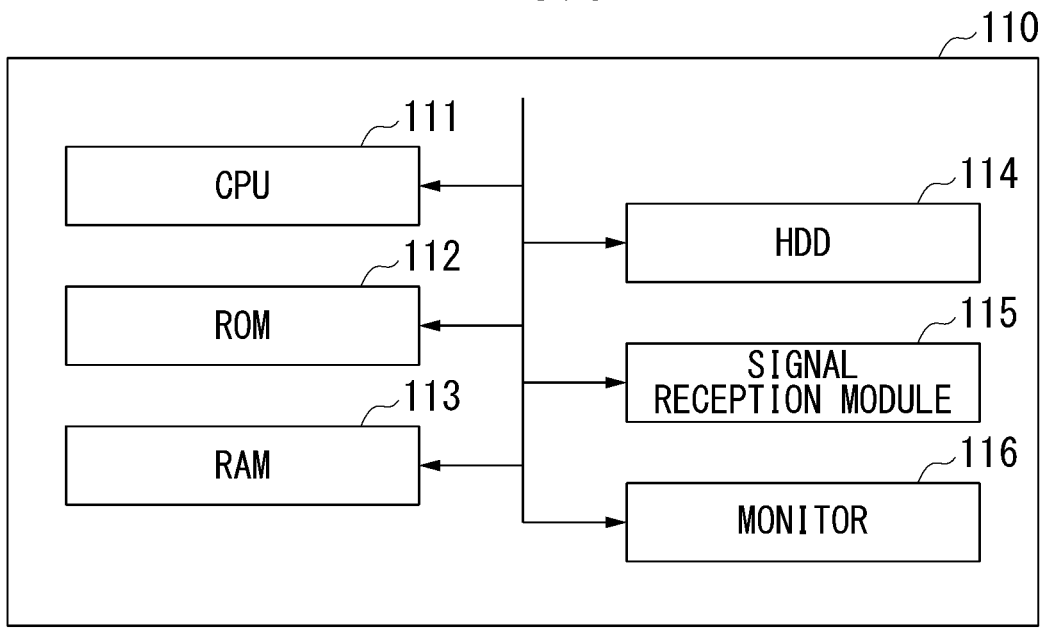
FIG. 3 is a hardware configuration diagram of a particle diameter acquisition device according to the first embodiment of the present invention.

As shown in FIG. 3, the particle diameter acquisition device 110 is a computer including a CPU 111, a ROM 112, a RAM 113, an HDD 114, a signal reception module 115, a monitor 116, and the like.

Figure 4:
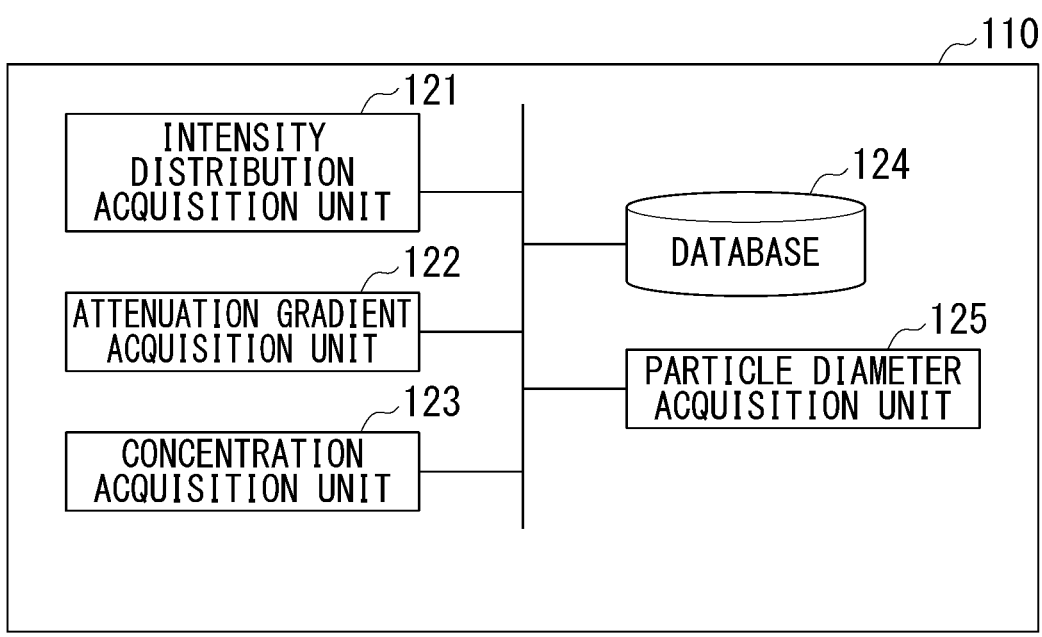
FIG. 4 is a functional block diagram of a particle diameter acquisition device according to the first embodiment of the present invention.

The CPU 111 of the particle diameter acquisition device 110 executes an analysis program which is stored in the HDD 114 or the like on the basis of an operation of an operator. The CPU 111 executes the analysis program, so that an intensity distribution acquisition unit 121, an attenuation gradient acquisition unit 122, a concentration acquisition unit 123, a database 124, and a particle diameter acquisition unit 125 are included in the particle diameter acquisition device 110 as shown in FIG. 4.

The intensity distribution acquisition unit 121 acquires an intensity distribution of the scattered light L2 scattered from the multi-phase flow 102 when the multi-phase flow 102 including the dispersed phase 103 is irradiated with the irradiation light L1. That is, the intensity distribution acquisition unit 121 acquires an intensity distribution of the scattered light L2 on the basis of an image captured by the camera 106.

The attenuation gradient acquisition unit 122 acquires an attenuation gradient in the intensity distribution on the basis of the intensity distribution of the scattered light L2.

The concentration acquisition unit 123 acquires a concentration of the dispersed phase 103 in the multi-phase flow 102.

The database 124 stores a particle diameter of the dispersed phase 103 and intensity distribution data which is an intensity distribution of the scattered light L2 for each concentration.

The particle diameter acquisition unit 125 acquires a particle diameter of the dispersed phase 103 on the basis of the acquired attenuation gradient, the concentration, and the intensity distribution data.

Figure 5:
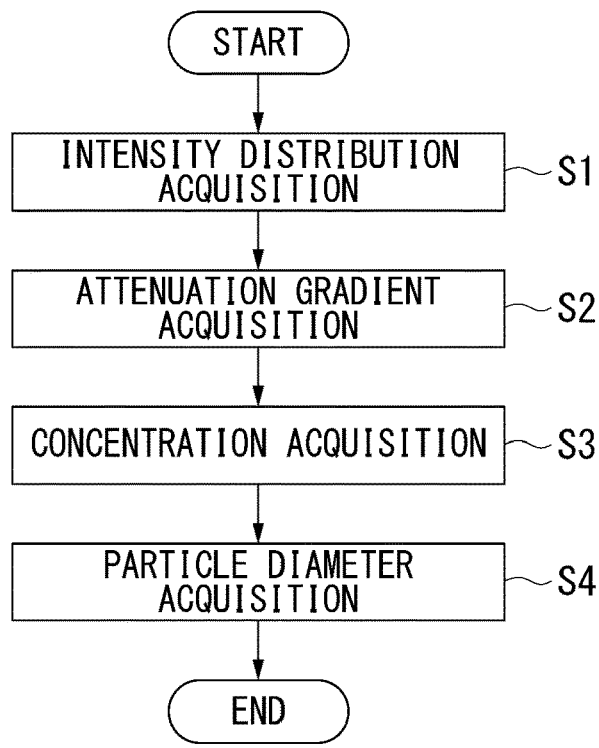
FIG. 5 is a flowchart showing a procedure of a particle diameter acquisition method according to the first embodiment of the present invention.

Next, a processing procedure of a particle diameter acquisition method executed by the particle diameter acquisition device 110 will be described with reference to FIG. 5. In the particle diameter acquisition method, an intensity distribution acquisition step S1, an attenuation gradient acquisition step S2, a concentration acquisition step S3, and a particle diameter acquisition step S4 are executed in order.

Figure 6:
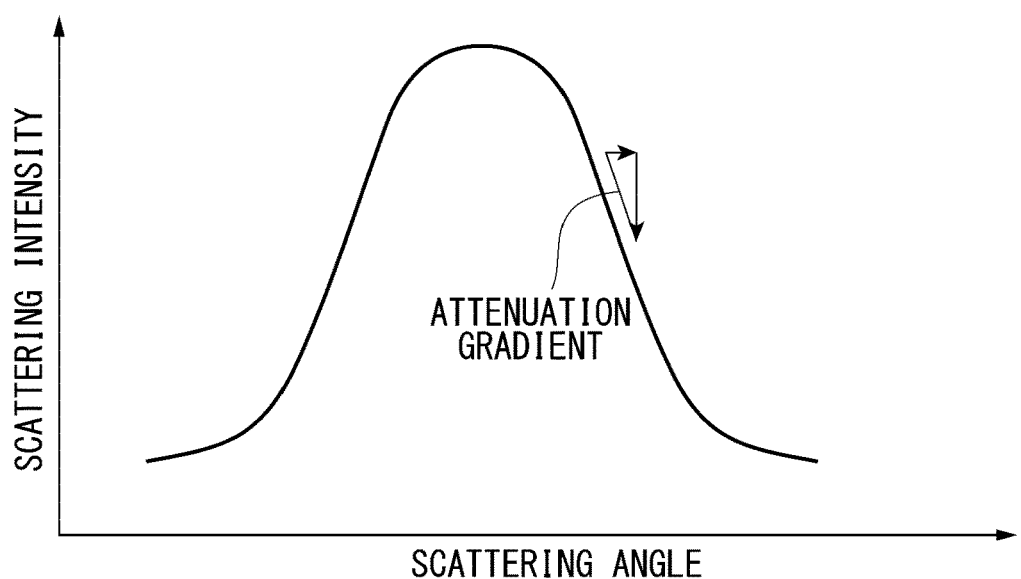
FIG. 6 is a graph showing an intensity distribution of scattered light detected in the first embodiment.

First, the intensity distribution acquisition step S1 is performed by the intensity distribution acquisition unit 121. The intensity distribution acquisition unit 121 performs image processing on an image of the scattered light L2 which is captured by the camera to acquire an intensity distribution of the scattered light L2, that is, an intensity distribution for each scattering angle θ. FIG. 6 shows an intensity distribution of the scattered light L2 which is acquired by the intensity distribution acquisition unit 121. In the graph, the horizontal axis represents a scattering angle, and the vertical axis represents an intensity distribution for each scattering angle (scattering intensity distribution). The intensity distribution is a Gaussian distribution (normal distribution).

Next, the attenuation gradient acquisition step S2 is performed by the attenuation gradient acquisition unit 122. The attenuation gradient acquisition unit 122 acquires an attenuation gradient of an intensity distribution of the scattered light L2. That is, the attenuation gradient acquisition unit 122 acquires a gradient in a predetermined range in a curve of the intensity distribution of the scattered light L2 as an attenuation gradient on the basis of the curve. The attenuation gradient acquisition unit 122 may acquire an attenuation gradient by performing statistical processing and mathematical processing on the curve.

Next, the concentration acquisition step S3 is performed by the concentration acquisition unit 123. The concentration acquisition unit 123 acquires a concentration of the dispersed phase 103 in the multi-phase flow 102. The concentration acquisition unit 123 may directly acquire a detected value of a concentration of the multi-phase flow 102 using, for example, a densimeter, or may acquire a concentration by performing an arithmetic operation on the basis of other physical quantities of the multi-phase flow 102.

Next, the particle diameter acquisition step S4 is performed by the particle diameter acquisition unit 125. The particle diameter acquisition unit 125 acquires a particle diameter of the dispersed phase 103 by referring to the database 124 on the basis of the attenuation gradient acquired by the attenuation gradient acquisition unit 122 and the concentration acquired by the concentration acquisition unit 123.

Figure 7:
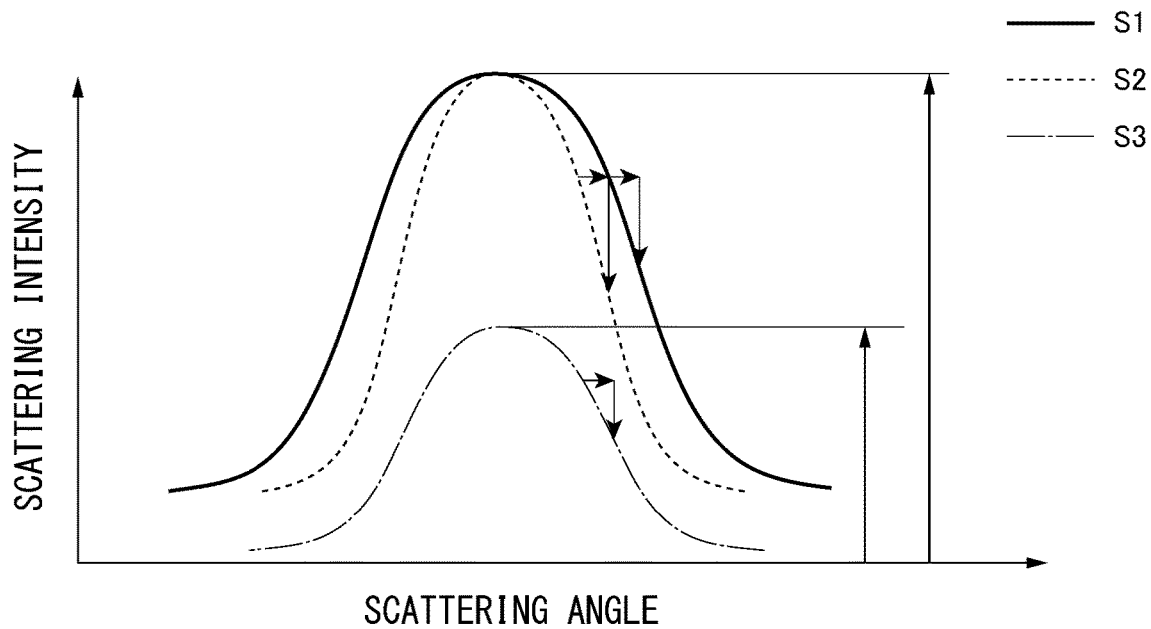
FIG. 7 is a graph showing an example of intensity distribution data stored in a database of the particle diameter acquisition device according to the first embodiment of the present invention.

Here, the database 124 will be described. A particle diameter of the dispersed phase 103 which is measured in advance and intensity distribution data which is an intensity distribution of the scattered light L2 for each concentration are stored in the database 124. FIG. 7 is a graph showing an example of intensity distribution data stored in the database 124. Here, curves (distribution curves) of intensity distributions of samples S1, S2, and S3 of the dispersed phases 103 having different particle diameters and concentrations are shown. Meanwhile, although only three samples S. S2, and S3 are described here, a large amount of intensity distribution data of the dispersed phases 103 having different particle diameters and concentrations is stored in the database 124.

The concentration of the dispersed phase 103 decreases as a scattering intensity corresponding to a peak of a distribution curve becomes higher, while the concentration of the dispersed phase 103 increases as the same scattering intensity becomes lower. In addition, the particle diameter of the dispersed phase 103 increases as a gradient (attenuation gradient) of a distribution curve becomes larger, while the particle diameter of the dispersed phase 103 decreases as the same distribution gradient becomes smaller. An attenuation gradient and a concentration of the dispersed phase 103 are proportional to, for example, the 1/n-th power of the particle diameter of the dispersed phase 103.

Therefore, from the graph of FIG. 7, when the dispersed phase 103 of the sample S1 is compared with the dispersed phase 103 of the sample S2, the degrees of scattering intensities corresponding to the respective peaks are substantially the same, and thus it can be seen that the degrees of concentrations are substantially the same and particle diameters are small. In addition, when the dispersed phase 103 of the sample S1 is compared with the dispersed phase 103 of the sample S3, scattering intensities corresponding to the respective peaks are high, and thus it can be seen that the concentrations thereof are low and the particle diameters thereof are large.

In addition, from the same graph, when the dispersed phase 103 of the sample S2 is compared with the dispersed phase 103 of the sample S1, the degrees of scattering intensities corresponding to the respective peaks are substantially the same, and thus it can be seen that the degrees of concentrations are substantially the same and particle diameters are large. In addition, when the dispersed phase 103 of the sample S2 is compared with the dispersed phase 103 of the sample S3, scattering intensities corresponding to the respective peaks are high, and thus it can be seen that the concentrations thereof are low and the particle diameters thereof are large.

In addition, from the same graph, when the dispersed phase 103 of the sample S3 is compared with the dispersed phases 103 of the samples S1 and S2, scattering intensities corresponding to the respective peaks are low, and thus it can be seen that the concentrations thereof are high and the particle diameters thereof are small.

The particle diameter acquisition unit 125 specifies a measured particle diameter of the dispersed phase 103 with reference to such intensity distribution data.

For example, first, the particle diameter acquisition unit 125 selects a sample having a concentration which is the same as or the most approximate to the concentrations acquired from the plurality of samples S1, S2, and S3 by the concentration acquisition unit 123. Here, a gradient of an intensity distribution of the scattered light L2 is a function proportional to the 0.5-th power of the particle diameter of the dispersed phase 103, and its proportional coefficient is proportional to the concentration of the dispersed phase 103. In the present embodiment in which the concentration of the dispersed phase 103 is acquired, a sample corresponding to the dispersed phase 103 for which measurement has been performed can be selected from among the plurality of samples S1, S2, and S3 recorded in the database 124.

In the present embodiment, a concentration of the dispersed phase 103 to be measured is the same as or approximate to those of the samples S1 and S2 among the plurality of samples S1, S2, and S3. For this reason, the sample S3 is excluded, and the samples S1 and S2 are selected.

Thereafter, the particle diameter acquisition unit 125 compares an attenuation gradient of the dispersed phase 103, as an object to be measured, which is acquired by the attenuation gradient acquisition unit 122 with attenuation gradients of the samples S1 and S2. In addition, a sample of an attenuation gradient which is the same as or the most approximate to the attenuation gradient of the dispersed phase 103 to be measured is selected. In the present embodiment, an attenuation gradient of the sample S1 out of the samples S1 and S2 is the same as or approximate to the attenuation gradient of the dispersed phase 103 to be measured. For this reason, the sample S2 is excluded, and the sample S1 is selected.

In addition, the particle diameter acquisition unit 125 outputs the particle diameter of the sample S1 to a monitor as a particle diameter of the dispersed phase 103 to be measured.

As described above, according to the measurement method of the present embodiment, a particle diameter of the dispersed phase 103 can be acquired with a high level of accuracy by utilizing the database 124.

Meanwhile, an example in which the particle diameter acquisition unit 125 selects the samples S1, S2, and S3 in a stepwise manner on the basis of a concentration and a particle diameter of the dispersed phase 103 to be measured has been described above. However, the present invention is not limited thereto, and for example, the particle diameter acquisition unit 125 may select a sample having a concentration and a particle diameter which are the most approximate to the concentration and the particle diameter of the dispersed phase 103 to be measured among the samples S1, S2, and S3 and output the particle diameter of the sample as a particle diameter of the dispersed phase 103 to be measured.

Second Embodiment

Figure 8:
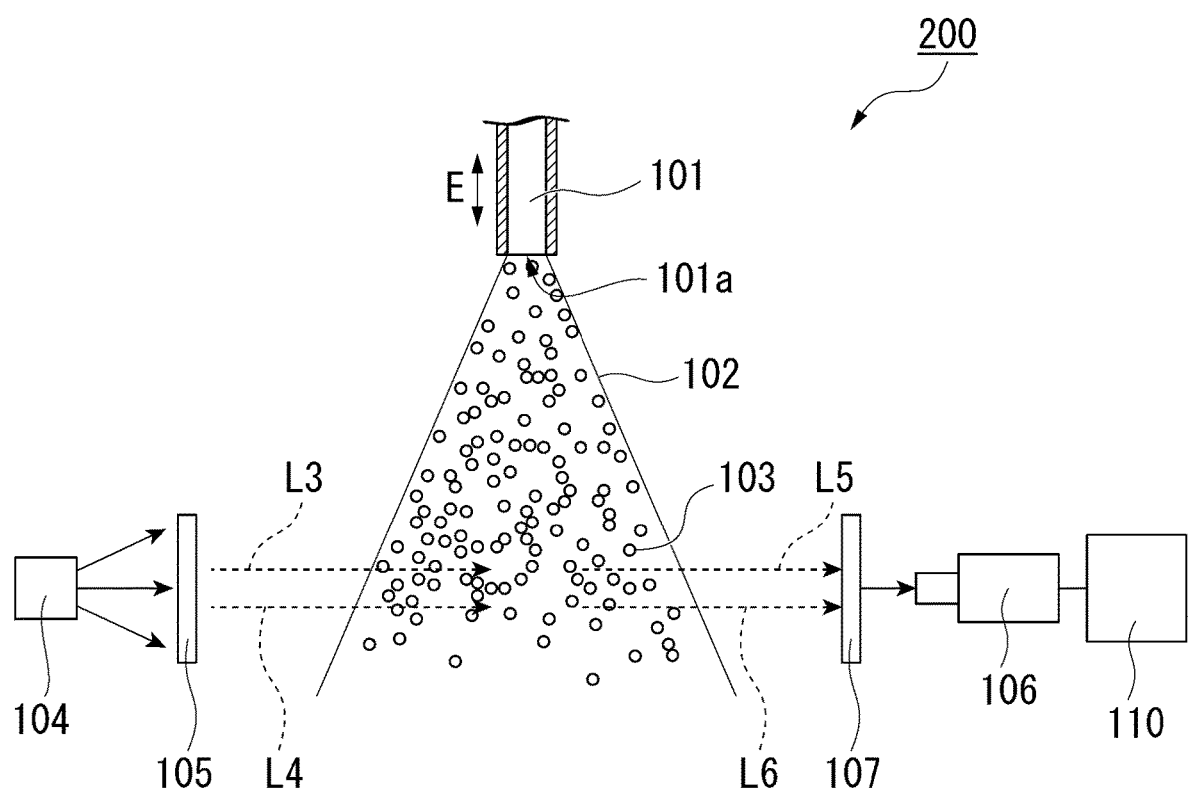
FIG. 8 is a schematic diagram showing an outline of a particle diameter acquisition system according to a second embodiment of the present invention.

FIG. 8 is a schematic diagram showing an outline of a particle diameter acquisition system 200 according to a second embodiment of the present invention. The particle diameter acquisition system 200 of the present embodiment is different from that of the first embodiment in that dispersed phases 103 are irradiated with light of at least two different types and scattered light thereof is measured and in terms of processing of a particle diameter acquisition device.

A light source 104 emits a plurality of irradiation light beams (in the present embodiment, first irradiation light L3 and first irradiation light L4) having different wavelengths to a multi-phase flow 102 discharged from an opening 101a of a nozzle 101. That is, a light source 104 can selectively emit the first irradiation light L3 and the second irradiation light L4 to the same multi-phase flow 102. Similarly to the first embodiment, it is preferable to use light (invisible light) such as ultraviolet rays or infrared rays as the irradiation light L3 and L4. In addition, similarly to the first embodiment, it is preferable that irradiation directions of the irradiation light L3 and L4 be directions substantially perpendicular to an extension direction E of a nozzle 101 in the vicinity of the opening 101a of the nozzle 101.

Meanwhile, concentrations of a plurality of dispersed phases 103 included in the multi-phase flow 102 are already known in the first embodiment. On the other hand, it is assumed that concentrations are not known at a point in time when measurement is performed in the second embodiment.

A camera captures an image of first scattered light L5 based on the first irradiation light L3 and second scattered light L6 based on the first irradiation light L4.

Figure 9:
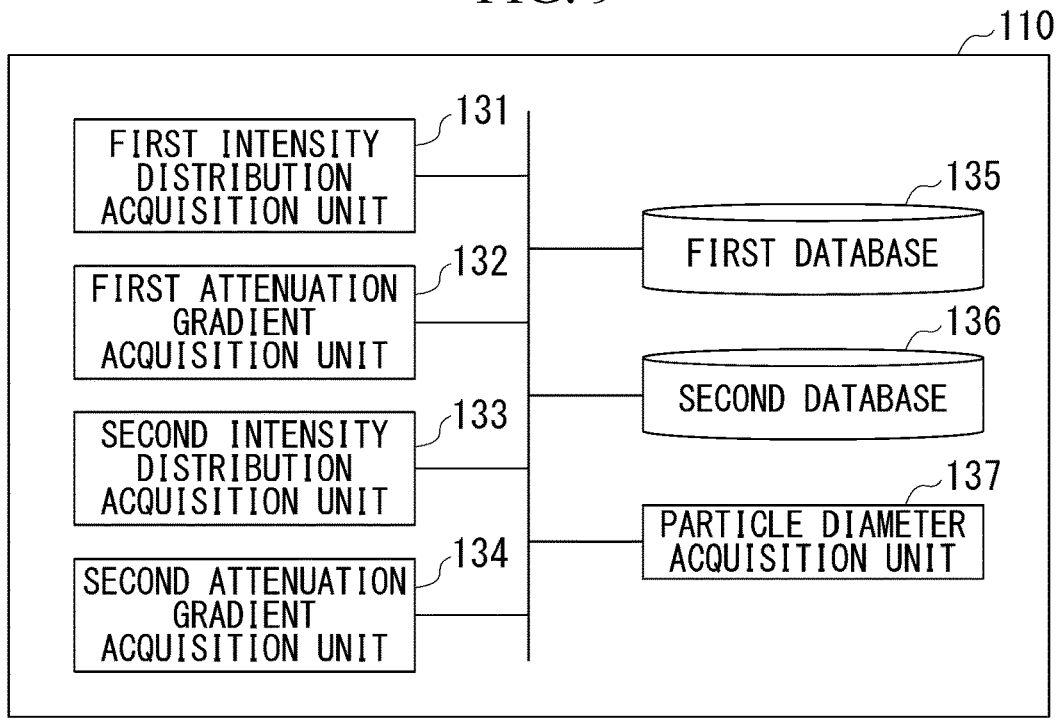
FIG. 9 is a functional block diagram of a particle diameter acquisition device according to the second embodiment of the present invention.

A first intensity distribution acquisition unit 131, a first attenuation gradient acquisition unit 132, a second intensity distribution acquisition unit 133, a second attenuation gradient acquisition unit 134, a first database 135, a second database 136, and a particle diameter acquisition unit 137 are included in the particle diameter acquisition device 110 of the second embodiment as shown in FIG. 9.

The first intensity distribution acquisition unit 131 acquires an intensity distribution of the first scattered light L5 scattered from a multi-phase flow at the time of irradiating the multi-phase flow with the first irradiation light L3 as a first intensity distribution.

The first attenuation gradient acquisition unit 132 acquires an attenuation gradient of the first intensity distribution.

The second intensity distribution acquisition unit 133 acquires an intensity distribution of the second scattered light L6 scattered from a multi-phase flow at the time of irradiating the multi-phase flow with the second irradiation light L4 as a second intensity distribution. The second attenuation gradient acquisition unit 134 acquires an attenuation gradient of the second intensity distribution.

First correlation data which is a correlation between a particle diameter for each concentration of a dispersed phase at the time of irradiating the multi-phase flow with the first irradiation light L3 and an attenuation gradient of an intensity distribution of the first scattered light L5 is stored in the first database 135.

Second correlation data which is a correlation between a particle diameter for each concentration of a dispersed phase at the time of irradiating the multi-phase flow with the first irradiation light L5 and an attenuation gradient of an intensity distribution of the second scattered light L6 is stored in the second database 136.

The particle diameter acquisition unit 137 acquires a particle diameter of a dispersed phase on the basis of an attenuation gradient of a first intensity distribution and an attenuation gradient of a second intensity distribution with reference to the first correlation data and the second correlation data.

Figure 10:
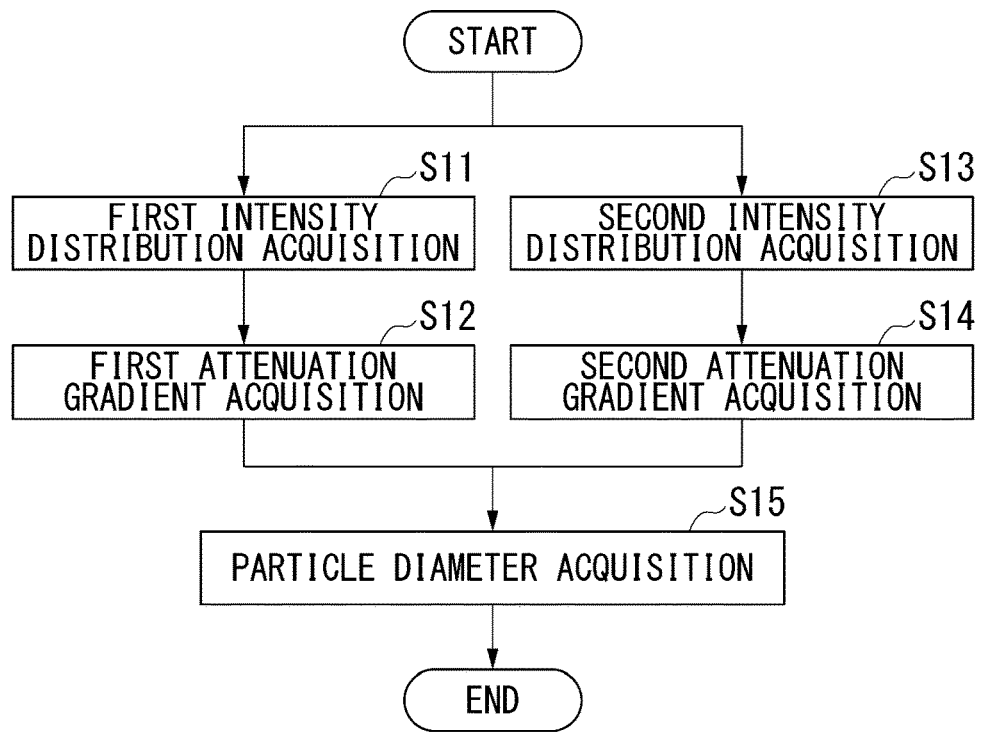
FIG. 10 is a flowchart showing a procedure of a particle diameter acquisition method according to the second embodiment of the present invention.

Next, a processing procedure of a particle diameter acquisition method executed by the particle diameter acquisition device will be described with reference to FIG. 10. In the particle diameter acquisition method of the present embodiment, a first intensity distribution acquisition step S1, a first attenuation gradient acquisition step S12, a second intensity distribution acquisition step S13, a second attenuation gradient acquisition step S4, and a particle diameter acquisition step S15 are executed.

Figure 11A:
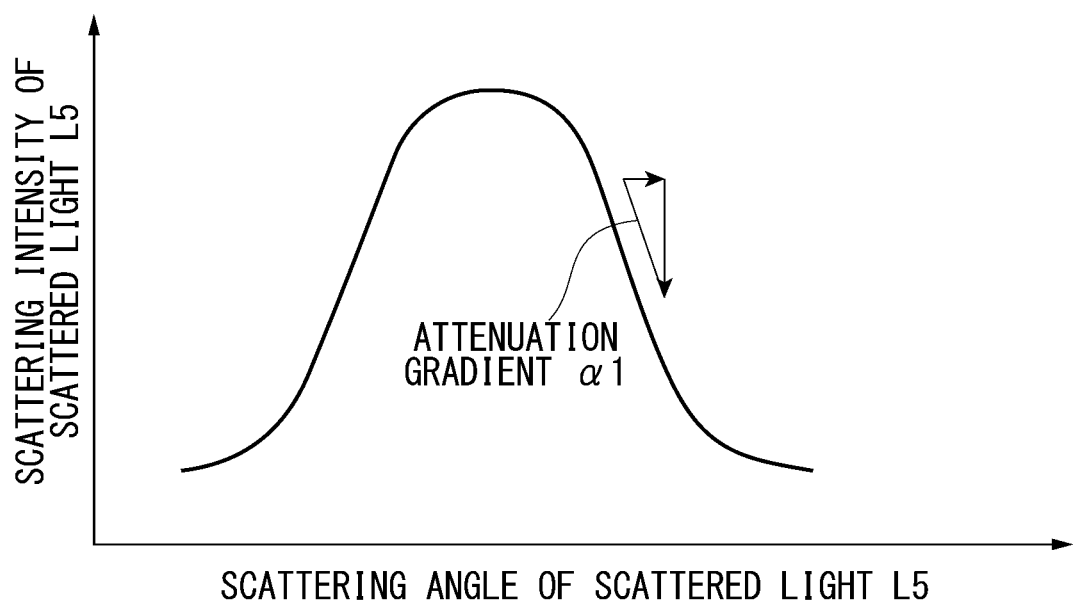
FIG. 11A is a graph showing an intensity distribution of measured first scattered light.

First, the first intensity distribution acquisition step S11 is performed by the first intensity distribution acquisition unit 131. The first intensity distribution acquisition unit 131 performs image processing on an image of the first scattered light L5 which is captured by the camera to acquire an intensity distribution of the first scattered light L5, that is, an intensity distribution for each scattering angle θ. FIG. 11A shows an intensity distribution of the first scattered light L5.

Next, the first attenuation gradient acquisition step S12 is performed by the first attenuation gradient acquisition unit 132. The first attenuation gradient acquisition unit 132 acquires an attenuation gradient of an intensity distribution of the scattered light L2. That is, the attenuation gradient acquisition unit acquires a gradient in a predetermined range in a curve of an intensity distribution of the first scattered lightL 5 as an attenuation gradient α1 on the basis of the curve.

The second intensity distribution acquisition step S13 and the first attenuation gradient acquisition step S14 are performed in parallel with the first intensity distribution acquisition step S11 and the first attenuation gradient acquisition step S12.

Figure 11B:
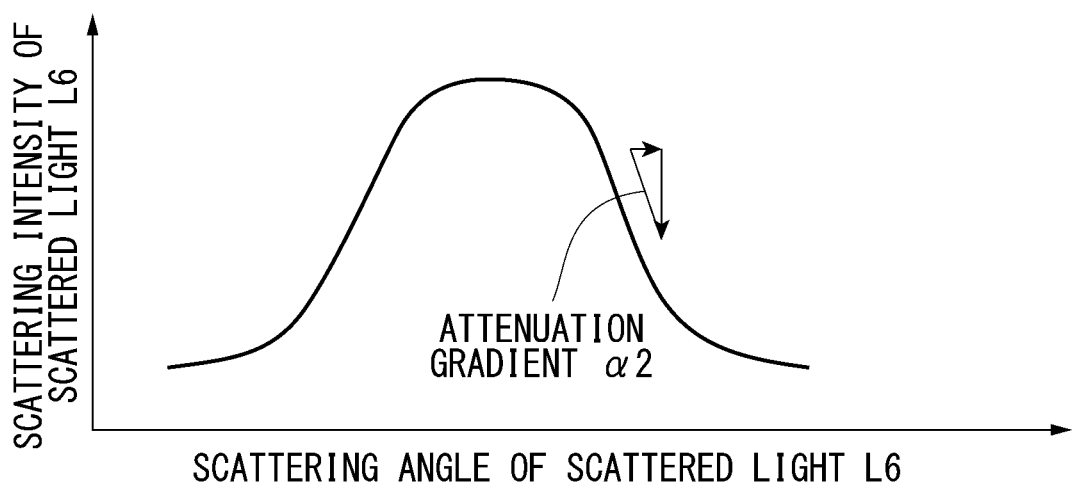
FIG. 11B is a graph showing an intensity distribution of measured second scattered light.

First, the second intensity distribution acquisition step S12 is performed by the second intensity distribution acquisition unit 133. The second intensity distribution acquisition unit 133 performs image processing on an image of the second scattered light L6 which is captured by the camera to acquire an intensity distribution of the second scattered light L6, that is, an intensity distribution for each scattering angle θ. FIG. 11B shows an intensity distribution of the first scattered light L5.

Next, the second attenuation gradient acquisition step S14 is performed by the second attenuation gradient acquisition unit 134. The second attenuation gradient acquisition step S14 is performed by the second attenuation gradient acquisition unit 134. The second attenuation gradient acquisition unit 134 acquires an attenuation gradient of an intensity distribution of the scattered light L6. That is, the second attenuation gradient acquisition unit 134 acquires a gradient in a predetermined range in a curve of an intensity distribution of the second scattered light L6 as an attenuation gradient α2 on the basis of the curve.

Next, the particle diameter acquisition step S15 is performed by the particle diameter acquisition unit 137. Here, the first database 135 and the second database 136 will be described.

Figure 12A:
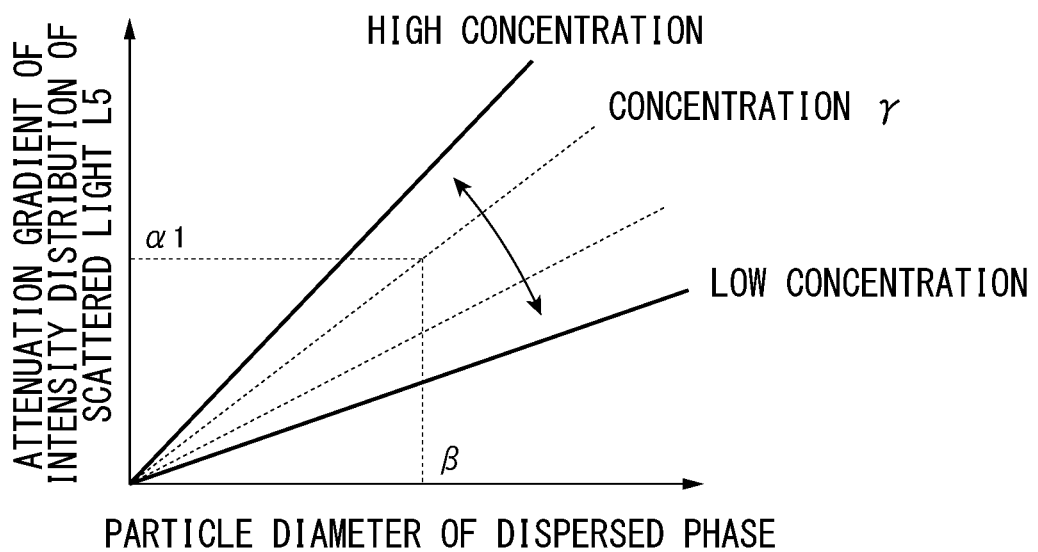
FIG. 12A is first correlation data showing a correlation between an attenuation gradient of an intensity distribution and a particle diameter of a dispersed phase of first scattered light stored in a first database.
Figure 12B:
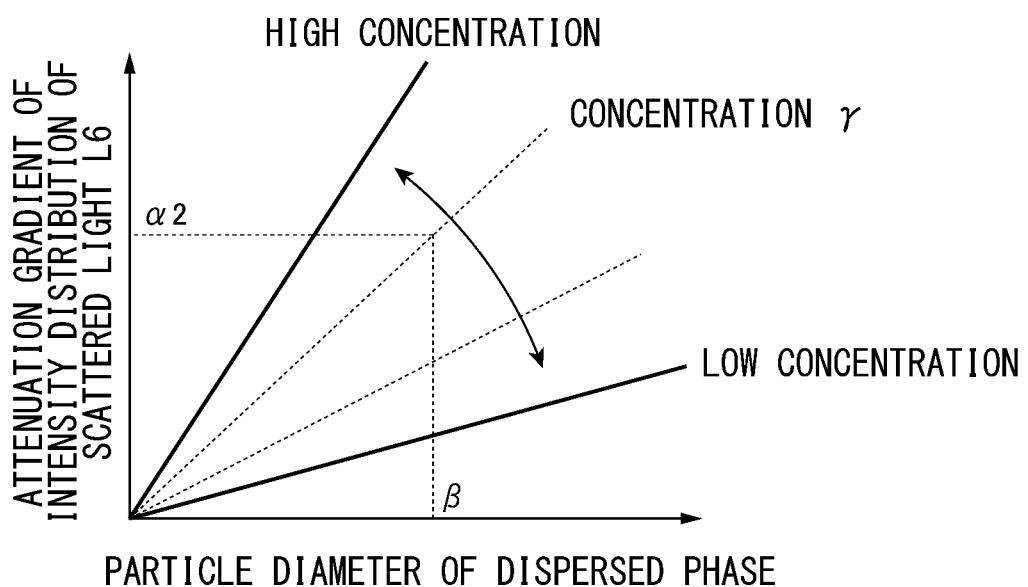
FIG. 12B is second correlation data showing a correlation between an attenuation gradient of an intensity distribution and a particle diameter of a dispersed phase of second scattered light stored in a second database.

First correlation data shown in FIG. 12(a) is stored in the first database 135. The first correlation data is data showing a correlation between an attenuation gradient of the first scattered light L5 in a dispersed phase of each concentration and a particle diameter of the dispersed phase. The data can be obtained by arranging measured values obtained by measuring the first scattered light L5 of a dispersed phase for every plurality of particle diameters and concentrations. The first correlation data has a curve for every plurality of concentrations Second correlation data shown in FIG. 12(b) is stored in the second database 136. The second correlation data is data showing a correlation between an attenuation gradient of the second scattered light L6 in a dispersed phase of each concentration and a particle diameter of the dispersed phase. The data can be obtained by arranging measured values obtained by measuring the second scattered light L6 of a dispersed phase for every plurality of particle diameters and concentrations. The second correlation data has a curve for every plurality of concentrations.

A particle diameter of the dispersed phase 103 and an attenuation gradient of an intensity distribution show a positive correlation. Further, a gradient of an intensity distribution tends to become larger as the concentration of the dispersed phase 103 becomes higher, while a gradient of an intensity distribution tends to become smaller as the concentration of the dispersed phase 103 becomes lower. Data individually indicating a particle diameter and a concentration of a dispersed phase and an attenuation gradient of an intensity distribution of scattered light scattered by a dispersed layer are stored in the first database 135 and the second database 136 in advance as first correlation data and second correlation data of a database.

The particle diameter acquisition unit 137 acquires a particle diameter of a dispersed phase on the basis of a first attenuation gradient and a second attenuation gradient with reference to the first correlation data and the second correlation data.

Here, even in a case where each of the first scattered light L5 and the second scattered light L6 is measured, a plurality of measurement results of obtained particle diameters and concentrations are related to the same dispersed phase 103, and thus all of the measurement results have the same value. Consequently, curves of the first correlation data related to the scattered light L5 and the second correlation data related to the scattered light L6 for each concentration are compared with each other, and values which are common to the first correlation data and the second correlation data are retrieved as a particle diameter β and a concentration γ of the dispersed phase 103 which correspond to each of attenuation gradients α1 and α2 of intensity distributions. In addition, the retrieved values are acquired as the particle diameters and the concentrations.

As described above, according to the measurement method of the present embodiment, a particle diameter of the dispersed phase 103 can be acquired with a high level of accuracy by utilizing a database regardless of whether or not scattered light is visible light. In addition, unlike the first embodiment, even when the value of a concentration of the dispersed phase 103 in the multi-phase flow 102 is not yet known, a particle diameter can be obtained with a high level of accuracy.

EXPLANATION OF REFERENCES

100 Particle diameter acquisition system
101 Nozzle
102 Multi-phase flow
103 Dispersed phase
104 Light source
105 First medium
106 Camera (detection unit)
107 Second medium
110 Particle diameter acquisition device
111 CPU
112 ROM
113 RAM
114 HDD
115 Signal reception module
116 Monitor
121 intensity distribution acquisition unit
122 Attenuation gradient acquisition unit
123 Concentration acquisition unit
124 Database
125 Particle diameter acquisition unit
131 First intensity distribution acquisition unit
132 First attenuation gradient acquisition unit
133 Second intensity distribution acquisition unit
134 Second attenuation gradient acquisition unit
135 First database
136 Second database
137 Particle diameter acquisition unit
200 Particle diameter acquisition system
S1 Intensity distribution acquisition step
S2 Attenuation gradient acquisition step
S3 Concentration acquisition step
S4 Particle diameter acquisition step
S11 First intensity distribution acquisition step
S12 First attenuation gradient acquisition step
S13 Second intensity distribution acquisition step
S14 Second attenuation gradient acquisition step
S15 Particle diameter acquisition step
L1 Irradiation light
L2 Scattered light
L3 First irradiation light
L4 Second irradiation light
L5 First scattered light
L6 Second scattered light

What is claimed is:

1. A particle diameter acquisition device comprising:
an intensity distribution acquisition unit which is configured to acquire an intensity distribution of scattered light scattered from a multi-phase flow including a dispersed phase at a time of irradiating the multi-phase flow with irradiation light;
an attenuation gradient acquisition unit which is configured to acquire an attenuation gradient in the intensity distribution on the basis of the intensity distribution of the scattered light;
a concentration acquisition unit which is configured to acquire a concentration of the dispersed phase in the multi-phase flow;
a database which is configured to store intensity distribution data which is an intensity distribution of scattered light for each particle diameter and concentration of a dispersed phase; and
a particle diameter acquisition unit which is configured to acquire a particle diameter of the dispersed phase on the basis of the acquired attenuation gradient, concentration, and intensity distribution data with reference to the intensity distribution data.

2. The particle diameter acquisition device according to claim 1, wherein the dispersed phase is droplets.

3. The particle diameter acquisition device according to claim 1, wherein the irradiation light is invisible light.

4. A particle diameter acquisition system comprising:
the particle diameter acquisition device according to claim 1;
a nozzle which is configured to spray a multi-phase flow;
a light source which is configured to irradiate the multi-phase flow with irradiation light; and
a detection unit which is configured to detect scattered Light scattered from the multi-phase flow.

5. A particle diameter acquisition device comprising:
a first intensity distribution acquisition unit which is configured to acquire a first intensity distribution of scattered light scattered from a multi-phase flow including a dispersed phase at the time of irradiating the multi-phase flow with first irradiation light;
a first attenuation gradient acquisition unit which is configured to acquire an attenuation gradient of the first intensity distribution;
a second intensity distribution acquisition unit which is configured to acquire an intensity distribution of scattered light scattered from the multi-phase flow at the time of irradiating the multi-phase flow with first irradiation light having a wavelength different from that of the first irradiation light;
a second attenuation gradient acquisition unit which is configured to acquire an attenuation gradient of the second intensity distribution;
a first database which is configured to store first correlation data which is a correlation between a particle diameter for each concentration of the dispersed phase at the time of irradiating the multi-phase flow with the first irradiation light and an attenuation gradient of an intensity distribution of scattered light;
a second database which is configured to store second correlation data which is a correlation between a particle diameter for each concentration of the dispersed phase at the time of irradiating the multi-phase flow with the first irradiation light and an attenuation gradient of an intensity distribution of scattered light; and
a particle diameter acquisition unit which is configured to acquire a particle diameter of the dispersed phase on the basis of the attenuation gradient of the firm intensity distribution and the attenuation gradient of the second intensity distribution with reference to the first correlation data and the second correlation data.

6. The particle diameter acquisition device according to claim 5, wherein the dispersed phase is droplets.

7. The particle diameter acquisition device according to claim 5, wherein the irradiation light is invisible light.

8. A particle diameter acquisition system comprising:
the particle diameter acquisition device according to claim 5;
a nozzle which is configured to spray a multi-phase flow;
a light source which is configured to irradiate the multi-phase flow with irradiation light; and
a detection unit which is configured to detect scattered light scattered from the multi-phase flow.

9. A particle diameter acquisition method comprising:
an intensity distribution acquisition step of acquiring an intensity distribution of scattered light scattered from a multi-phase flow including a dispersed phase at the time of irradiating the multi-phase flow with irradiation light;
an attenuation gradient acquisition step of acquiring an attenuation gradient in the intensity distribution on the basis of the intensity distribution of the scattered light;
a concentration acquisition step of acquiring a concentration of the dispersed phase in the multi-phase flow; and
a particle diameter acquisition step of acquiring a particle diameter of the dispersed phase on the basis of the acquired attenuation gradient, concentration, and intensity distribution data with reference to a database which is configured to store intensity distribution data which is an intensity distribution of scattered light for each particle diameter and concentration of a dispersed phase.

10. A particle diameter acquisition method comprising:
a first intensity distribution acquisition step of acquiring a first intensity distribution of scattered light scattered from a multi-phase flow including a dispersed phase at the time of irradiating the multi-phase flow with first irradiation light;
a first attenuation gradient acquisition step of acquiring an attenuation gradient of the first intensity distribution;
a second intensity distribution acquisition step of acquiring an intensity distribution of scattered light scattered from the multi-phase flow at the time of irradiating the multi-phase flow with first irradiation light having a wavelength different from that of the first irradiation light;
a second attenuation gradient acquisition step of acquiring an attenuation gradient of the second intensity distribution; and
a particle diameter acquisition step of acquiring a particle diameter of the dispersed phase on the basis of the attenuation gradient of the first intensity distribution and the attenuation gradient of the second intensity distribution with reference to a first database which is configured to store first correlation data which is a correlation between a particle diameter for each concentration of the dispersed phase at the time of irradiating the multi-phase flow with the first irradiation light and an attenuation gradient of an intensity distribution of scattered light, and a second database which is configured to store second correlation data which is a correlation between a particle diameter for each concentration of the dispersed phase at the time of irradiating the multi-phase flow with the first irradiation light and an attenuation gradient of an intensity distribution of scattered light.

* * * * *